Figure 1:
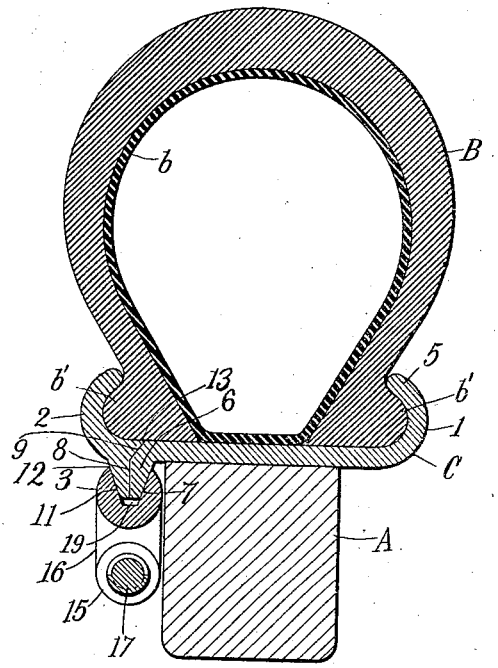

T. MIDGLEY.
VEHICLE WHEEL.
APPLICATION FILED APR. 29, 1905.

1,086,330.

Patented Feb. 3, 1914.

Witnesses
Raphaël Netter
Baxter Morton

Inventor
Thomas Midgley
By his Attorney
Ernest Hopkinson

UNITED STATES PATENT OFFICE.

THOMAS MIDGLEY, OF HARTFORD, CONNECTICUT, ASSIGNOR, BY MESNE ASSIGNMENTS, TO THE UNITED STATES TIRE COMPANY, A CORPORATION OF NEW YORK.

VEHICLE-WHEEL.

1,086,330.

Specification of Letters Patent. Patented Feb. 3, 1914.

Application filed April 29, 1905. Serial No. 258,129.

*To all whom it may concern:*

Be it known that I, THOMAS MIDGLEY, a citizen of the United States, residing in the city of Hartford, county of Hartford, and State of Connecticut, have invented new and useful Improvements in Vehicle-Wheels, of which the following is a specification.

This invention relates to vehicle wheels, and more particularly to the rims applied to vehicle wheels to provide suitable seats for resilient tires.

The principal object of the invention is to provide an improved rim construction by which the application of a resilient tire to the wheel and its removal therefrom may be facilitated and by means of which the resilient tire will be securely held against accidental displacement after application to the wheel. The rim is primarily designed for use with pneumatic tires and especially with pneumatic tires of the standard "clencher" type; but the invention may be embodied in rims adapted for use with solid tires, cushion tires, or pneumatic tires of other types than the "clencher."

In the drawings accompanying this application and forming a part thereof, I have illustrated one embodiment of the invention only and have described that embodiment hereinafter, but it will be obvious that various changes may be made in the structure shown and described without departing from the spirit of the invention or exceeding the scope thereof, which is clearly defined in the appended claims.

Figure 2:
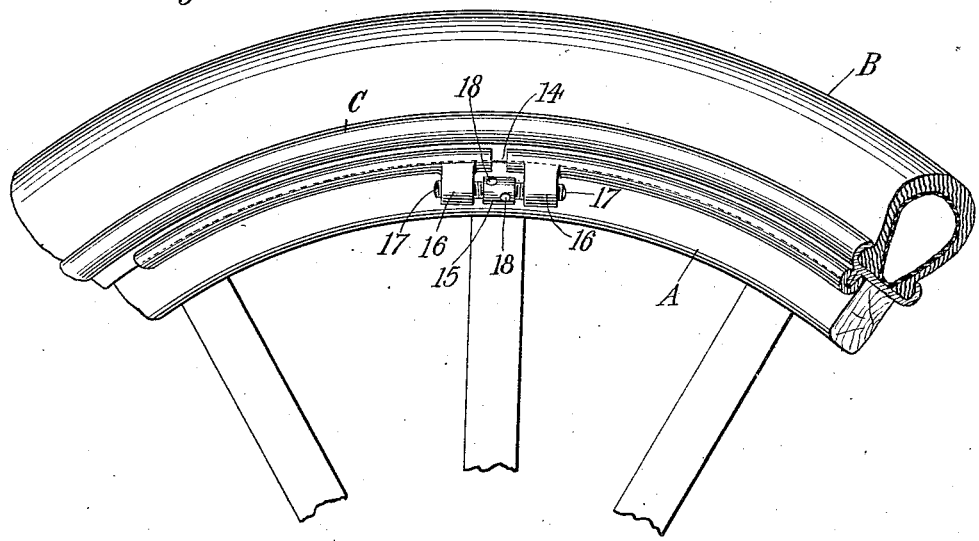

In the drawings: Figure 1 is a sectional view through a wheel felly provided with a rim embodying the present invention and bearing a standard "clencher" tire. Fig. 2 is a fragmentary view in perspective showing a portion of the wheel, the rim and the tire, and illustrating the expansion device by means of which the locking ring is seated.

Referring to the drawings in detail, A designates a wheel felly of standard construction and B designates the outer shoe or casing of a standard "clencher" tire, the inner tube of the tire being designated $b$. The outer shoe or casing B of the tire is constructed in the usual manner and is provided at its edges with outwardly projecting beads $b'$.

The rim which is designated generally as C comprises a main member 1, a removable side flange 2, and a locking ring 3. The main rim member 1 is preferably formed of a single piece of rolled metal of suitable gage having the middle portion flat on its wheel face and its tire face. One margin of the main rim member is bent outwardly from the felly of the wheel and curled over to form a permanent side flange 5 shaped to correspond to the outer surface of one of the beads $b'$ of the tire shoe or casing B. The other margin of the main rim member 1 is bent inward and presents a bead or rib 6 which extends inward beyond the wheel face of the metal portion 4 of the main rim member. This bead or rib 6 has an inclined face 7 which lies adjacent to the felly and an outer face 8 which is parallel to the plane of the wheel. The face 8 of the bead or rib 6 and a beveled surface 9 adjoining that face at its outer edge form the seating surface for the removable side flange 2. This removable side flange has a lip or bead 11 similar in form to the bead 6 formed on the main rim member and presenting an outer inclined surface 12. The removable side flange also presents a lateral shoulder 13 which engages the beveled seating surface 9 formed on the main rim member, so that when the removable side flange is applied to the main rim member the inclined seating surface 9 and the shoulder 13 coöperate to bring the side flange and main rim member into proper relation. The removable side flange is extended outward and curled over so as to correspond to the outer surface of one of the beads $b'$ of the tire casing, so that when the removable side flange is held in proper relation to the main rim member the rim presents at opposite sides two flanges corresponding exactly to the form of the beads at the edges of the tire shoe or casing.

The means employed for securing the removable side flange 2 in relation to the main rim member 1 consists preferably of the retaining ring 3 which is divided transversely at 14 and provided with a turn buckle 15 arranged between inwardly projecting lugs 16 which are formed upon the retention ring upon either side adjacent to its ends. The lugs 16 are, of course, provided with threaded openings for the reception of the threaded ends 17 of the turn buckle 15. The middle portion of the turn buckle is preferably larger in diameter than the ends and provided with a plurality of apertures 18 for the reception of a pin wrench. The retention ring 3 is provided on its outer surface with a longitudinal channel 19 the sides of which diverge, as best seen in Fig. 1, to correspond to the inclined surfaces of the beads 6 and 11 formed on the main rim member and removable side flange, respectively. The main rim member 1 is shrunk or otherwise permanently secured upon the wheel felly A and the removable side flange is secured to the main rim member by simply seating the removable side flange in the position shown in Fig. 1 and then expanding the retention ring 3 by means of the turn buckle 16 until the beads 6 and 11 of the main rim member and removable side flange are wedged tightly together between the sides of the channel 19 which is formed in the retention ring.

The removal of the side flange 2 is readily accomplished by contracting the retention ring by means of the turn buckle 15 until the bead 11 of the removable side flange may be disengaged from the channel 19 provided in the retention ring.

The application of the tire to the rim is always effected, as will be obvious, when the removable side flange is not in position, and in order to remove the tire from the rim, the removable side flange is always first removed in the manner above explained. Then the tire may be easily slipped laterally off the rim.

A special feature of the rim construction is the retention ring with the channel having diverging sides which is provided in the outer surface of the retention ring. By virtue of this form of channel and the correspondingly inclined sides of the beads 6 and 11 which are provided on the main rim member and removable side flange, respectively, the firm seating of the removable side flange upon the main rim member is always assured, even if the removable side flange and the main rim member do not correspond exactly in diameter.

Another special feature of the invention is the location of the retention ring at the inner side of the rim where it is protected from injury by the overhanging portion of the removable side flange.

While I have described only one form of my invention and have illustrated it in connection with only one form of tire, it is obvious that the rim may be readily modified in such a way as to adapt it to tires of other types.

Having thus described my invention, what I claim as new and desire to secure by Letters Patent is:

1. In a vehicle wheel, the combination with a main rim member and a removable side flange, of a locking ring having a surface inclined to the radii of the wheel adapted to wedge said side flange tightly against the main rim member.

2. In a vehicle wheel, the combination with a main rim member and a removable side flange, said main rim member having a bead or rib extending toward the center of the wheel and the removable side flange having a similar bead or rib contacting with the plane side of the first rib, of an expanding locking ring engaging both of said ribs or beads.

3. In a vehicle wheel, the combination with a main rim member having at one margin a rib or bead projecting from the wheel face of the main rim member and a removable side flange having a similar bead or rib, of an expansible ring inclosing both of said beads or ribs which are wedge-shaped for wedging the side flange against the main rim member.

4. In a vehicle wheel, the combination with a main rim member having a rib or bead on its wheel face and a removable side flange of the same internal diameter as said bead, of a locking member having a channel adapted to have seated therein said rib or bead and the inner portion of said removable side flange to hold the removable side flange in position.

5. In a vehicle wheel, the combination with a main rim member having a rib or bead upon its wheel face and a removable side flange having a corresponding rib or bead, each of said ribs or beads having an inclined side face, of a channeled member adapted to receive both of said ribs or beads and means for forcing said channeled member into position to securely hold said ribs or beads in contact.

6. In a vehicle wheel, the combination with a main rim member provided at one side with a seating surface comprising two portions disposed at angles to each other, of a side flange having faces adapted for contact with both portions of said seating surface and an expanding ring for positively locking said side flange in engagement with said main rim member.

7. In a vehicle wheel, the combination with a main rim member and removable side flange, each having a bead or rib projecting toward the center of the wheel, of an expansible retention ring having a channel adapted to receive both of said beads or ribs and having divergent sides, and means for expanding said retention ring.

8. The combination with a wheel felly, of a ring having an outwardly extending and inwardly turned flange at one edge to engage the tire and extending across and secured to the outer surface of the felly, a ring having an outwardly extending and inwardly turned flange to engage the tire at the other side, flanges on the adjacent edges of said rings extending inward therefrom parallel with one side of the rim, and a severed ring engaging said flanges to secure the rings together.

9. A wheel rim having a tread or tire-supporting part, with means along one edge for preventing the escape of a tire, and having along the other edge an inward-turned projection or flange extending continuously around said edge, in combination with an elastic locking ring engaging by outward expansion with the inner side of said projection or flange, and a tire-retaining flange having an inward projection abutting laterally against the said ring and held in place thereby, substantially as set forth.

10. In a vehicle wheel, the combination with a main rim member and a removable side flange, said main rim member having a bead or rib extending toward the center of the wheel and the removable side flange having a similar bead or rib, of an expanding locking ring inclosing both of said beads or ribs.

In testimony whereof, I have signed my name in the presence of two witnesses.

THOMAS MIDGLEY.

Witnesses:
WILLIAM SEWARD, Jr.,
ALEC O. HOLROYD.

Copies of this patent may be obtained for five cents each, by addressing the "Commissioner of Patents, Washington, D. C."